United States Patent
Lan et al.

(10) Patent No.: US 10,627,656 B2
(45) Date of Patent: Apr. 21, 2020

(54) METHOD FOR MANUFACTURING LCD PANEL

(71) Applicant: Shenzhen China Star Optoelectronics Technology Co., Ltd., Shenzhen, Guangdong (CN)

(72) Inventors: Song Lan, Shenzhen (CN); Hsiaohsien Chen, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 185 days.

(21) Appl. No.: 15/775,854

(22) PCT Filed: Mar. 26, 2018

(86) PCT No.: PCT/CN2018/080496
§ 371 (c)(1),
(2) Date: May 14, 2018

(87) PCT Pub. No.: WO2019/169676
PCT Pub. Date: Sep. 12, 2019

(65) Prior Publication Data
US 2019/0271865 A1    Sep. 5, 2019

(30) Foreign Application Priority Data
Mar. 5, 2015  (CN) ........................ 2018 1 0177468

(51) Int. Cl.
*G02F 1/13*  (2006.01)
*G02F 1/137*  (2006.01)
*G02F 1/1337*  (2006.01)
*C09K 19/54*  (2006.01)
*C09K 19/56*  (2006.01)

(52) U.S. Cl.
CPC .............. *G02F 1/13* (2013.01); *C09K 19/542* (2013.01); *C09K 19/56* (2013.01); *G02F 1/137* (2013.01); *G02F 1/133711* (2013.01); *C09K 2219/03* (2013.01); *G02F 2001/1316* (2013.01); *G02F 2001/13712* (2013.01); *G02F 2001/133742* (2013.01)

(58) Field of Classification Search
CPC ...... G02F 1/137; G02F 1/133711; G02F 1/13; C09K 19/56; C09K 19/542
See application file for complete search history.

(56) References Cited

FOREIGN PATENT DOCUMENTS

CN    106281363 A   *   1/2017

OTHER PUBLICATIONS

Machine Translation of CN-106281363-A (Year: 2017).*

* cited by examiner

*Primary Examiner* — Daniel McNally
(74) *Attorney, Agent, or Firm* — Mark M. Friedman

(57) ABSTRACT

The present disclosure provides a method for manufacturing a liquid crystal display (LCD) panel, including cleaning the first substrate by a hydrophobic surface cleaning material and cleaning the second substrate by a hydrophilic surface cleaning material; heating the first substrate and the second substrate at a high temperature; bonding the first substrate with the second substrate to from a liquid crystal cell; and irradiating the liquid crystal cell with UV light to form a first thin film on the surface of the first substrate and to form a second thin film on the surface of the second substrate.

18 Claims, 4 Drawing Sheets

METHOD FOR MANUFACTURING LCD PANEL

FIELD OF INVENTION

The present disclosure relates to the field of display technology, and more particularly to a method for manufacturing a liquid crystal display (LCD) panel.

BACKGROUND

For LCD panels, a layer of thin film material is formed on each array substrate and color filter substrate. Such layers are used to drive liquid crystal molecules between the array substrate and the color filter substrate to be aligned in a certain direction, and are called "alignment film." The alignment film is generally made of polyimide (PI), and is typically classified to include a photo-alignment type PI film and a rubbing alignment type PI film. However, no matter whether the alignment film is a photo-alignment type PI film or a rubbing alignment type PI film, formation of them have disadvantages. First, formation of rubbing alignment type PI film would be likely to generate dust particles, residual electrostatic charges, and rubbing marks, which will further result in low yield of manufactured LCD panels. Formation of photo-alignment type PI film can prevent these problems from occurring. However, due to poor thermal stability and aging resistance of photo-alignment type PI film, and its unfavorable anchoring action for liquid crystal molecules, formation of photo-alignment type PI film in LCD panels affects display quality of LCD panels. Secondly, the PI material itself is highly polar and tends to absorb water, and thus the PI material deteriorates during storage and transportation thereof. This leads to expensive prices of the PI material.

In case PI films are omitted in structures of LCD panels, the liquid crystal molecules cannot be aligned vertically. Although there is an alternative to use a self-alignment liquid crystal material, which is mixed with the liquid crystal molecules, where a vertical alignment agent of the self-alignment liquid crystal material is adsorbed on the array substrate to drive the liquid crystal molecules to align vertically, adsorption ability of the vertical alignment agent onto the substrate is weak, and thus alignment of the liquid crystal molecules is unsatisfactory. Therefore, there is a need to provide a method for manufacturing a liquid crystal display panel to solve the above-mentioned problems.

SUMMARY OF DISCLOSURE

The present disclosure provides a liquid crystal display (LCD) panel and a method for manufacturing the same, so as to solve the problems encountered by the prior art where adsorption ability of the vertical alignment agent onto the substrate is weak and alignment of the liquid crystal molecules is unsatisfactory.

In one aspect, the present disclosure provides a method for manufacturing a liquid crystal display (LCD) panel, comprising:

a step S10 of providing a first substrate and a second substrate;

a step S20 of cleaning the first substrate by a hydrophobic surface cleaning material and cleaning the second substrate by a hydrophilic surface cleaning material;

a step S30 of heating the first substrate and the second substrate at a high temperature of 100-150° C. for 1-10 minutes;

a step S40 of dropping a self-alignment liquid crystal material onto a surface of the first substrate, coating a sealant on a surface of the second substrate and curing the sealant, and bonding the first substrate with the second substrate to from a liquid crystal cell; and a step S50 of irradiating the liquid crystal cell with UV light to form a first thin film on the surface of the first substrate and to form a second thin film on the surface of the second substrate, wherein a thickness of the first thin film is less than a thickness of the second thin film.

In accordance with one preferred embodiment of the present disclosure, the first substrate is an array substrate, and the second substrate is a color filter substrate.

In accordance with one preferred embodiment of the present disclosure, the first substrate is a color filter substrate, and the second substrate is an array substrate.

In accordance with one preferred embodiment of the present disclosure, the hydrophobic surface cleaning material is a mixed solution including fatty acid glyceride and acetone, and a mass ratio of fatty acid glyceride to acetone is 3:997.

In accordance with one preferred embodiment of the present disclosure, the hydrophilic surface cleaning material is a mixed solution including propanetrione and water, and a mass ratio of propanetrione to water is 3:997.

In accordance with one preferred embodiment of the present disclosure, the self-alignment liquid crystal material includes a vertical alignment agent, a polymerizable monomer, and a negative liquid crystal material.

In accordance with one preferred embodiment of the present disclosure, an amount of the vertical alignment agent is 0.1-5 wt % based on a total mass of the self-alignment liquid crystal material, an amount of the polymerizable monomer is 0.1-1 wt % based on the total mass of the self-alignment liquid crystal material, and an amount of the negative liquid crystal material is 94-99.8 wt % based on the total mass of the self-alignment liquid crystal material.

In accordance with one preferred embodiment of the present disclosure, the vertical alignment agent has a formula of:

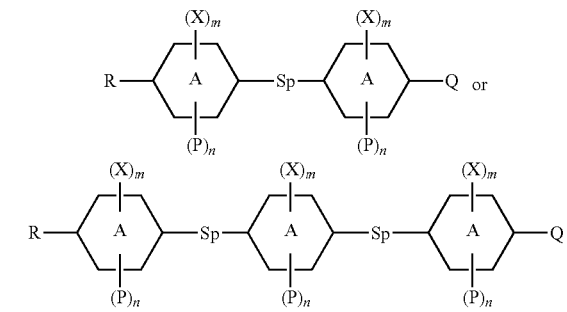

wherein Q is an amine group, —OH, —COOH, or —SH;

A is a benzene group or a cycloalkyl group;

Sp is —$(CH_2)_n$- and n is a number of 1-8, wherein $CH_2$ can be replaced with —O—, —S—, —CO—, —CO—O—, —O—CO—, —O—CO—O—, —$OCH_2$—, —$CH_2O$—, —CH=CH—, —CF=CF—, —CH=CH—COO—, —OCO—CH=CH—, or —C≡C—;

R is a straight or branched chain $C_3$-$C_{20}$ alkyl group, wherein $CH_2$ can be replaced with —O—, —CONH—, —COO—, —O—CO—, —CO—, or —CH=CH—, and H can be replaced with F or Cl;

P is a polymerizable group selected from at least one of a methyl methacrylate group, a methacrylate group, a vinyl group, a vinyloxy group, and an epoxy group; n is a number of the polymerizable groups which connect to a same aromatic ring and n is an integer of 1-3; and if n is greater than 1, the polymerizable groups can be same or different; and X is a substituted group selected from at least one of —F, —Cl, —Br, a methyl group, —CN, and a straight or branched chain $C_2$-$C_8$ alkyl group, wherein one or more methyl groups of the alkyl group which are not adjacent to each other can be replaced with O or S; m is a number of the substituted groups which connect to the same aromatic ring and m is an integer of 1-3; if m is greater than 1, the polymerizable groups can be same or different; and n+m is less than a number of groups to which the aromatic ring at most connect.

In accordance with one preferred embodiment of the present disclosure, in the step of S50, an irradiation energy of the UV light is 85-100 MW/cm², and an irradiation duration of the UV light is 20-100 minutes.

In another aspect, the present disclosure provides a method for manufacturing a liquid crystal display (LCD) panel, comprising:

a step S10 of providing a first substrate and a second substrate;

a step S20 of cleaning the first substrate by a hydrophobic surface cleaning material and cleaning the second substrate by a hydrophilic surface cleaning material;

a step S30 of heating the first substrate and the second substrate at a high temperature;

a step S40 of dropping a self-alignment liquid crystal material onto a surface of the first substrate, coating a sealant on a surface of the second substrate and curing the sealant, and bonding the first substrate with the second substrate to from a liquid crystal cell; and a step S50 of irradiating the liquid crystal cell with UV light to form a first thin film on the surface of the first substrate and to form a second thin film on the surface of the second substrate, wherein a thickness of the first thin film is less than a thickness of the second thin film.

In accordance with one preferred embodiment of the present disclosure, the first substrate is an array substrate, and the second substrate is a color filter substrate.

In accordance with one preferred embodiment of the present disclosure, the first substrate is a color filter substrate, and the second substrate is an array substrate.

In accordance with one preferred embodiment of the present disclosure, the hydrophobic surface cleaning material is a mixed solution including fatty acid glyceride and acetone, and a mass ratio of fatty acid glyceride to acetone is 3:997.

In accordance with one preferred embodiment of the present disclosure, the hydrophilic surface cleaning material is a mixed solution including propanetrione and water, and a mass ratio of propanetrione to water is 3:997.

In accordance with one preferred embodiment of the present disclosure, the self-alignment liquid crystal material includes a vertical alignment agent, a polymerizable monomer, and a negative liquid crystal material.

In accordance with one preferred embodiment of the present disclosure, an amount of the vertical alignment agent is 0.1-5 wt % based on a total mass of the self-alignment liquid crystal material, an amount of the polymerizable monomer is 0.1-1 wt % based on the total mass of the self-alignment liquid crystal material, and an amount of the negative liquid crystal material is 94-99.8 wt % based on the total mass of the self-alignment liquid crystal material.

In accordance with one preferred embodiment of the present disclosure, the vertical alignment agent has a formula of:

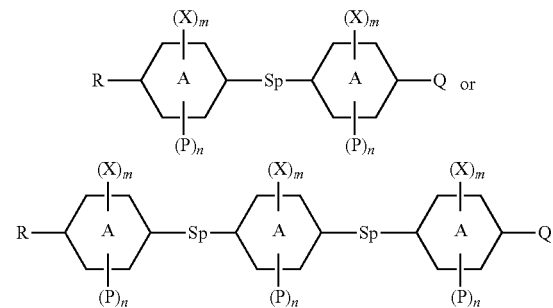

wherein Q is an amine group, —OH, —COOH, or —SH;

A is a benzene group or a cycloalkyl group;

Sp is —$(CH_2)n$- and n is a number of 1-8, wherein $CH_2$ can be replaced with —O—, —S—, —CO—, —CO—O—, —O—CO—, —O—CO—O—, —OCH2-, —CH2O—, —CH=CH—, —CF=CF—, —CH=CH—COO—, —OCO—CH=CH—, or —C≡C—;

R is a straight or branched chain $C_3$-$C_{20}$ alkyl group, wherein $CH_2$ can be replaced with —O—, —CONH—, —COO—, —O—CO—, —CO—, or —CH=CH—, and H can be replaced with F or Cl;

P is a polymerizable group selected from at least one of a methyl methacrylate group, a methacrylate group, a vinyl group, a vinyloxy group, and an epoxy group; n is a number of the polymerizable groups which connect to a same aromatic ring and n is an integer of 1-3; and if n is greater than 1, the polymerizable groups can be same or different; and X is a substituted group selected from at least one of —F, —Cl, —Br, a methyl group, —CN, and a straight or branched chain $C_2$-$C_8$ alkyl group, wherein one or more methyl groups of the alkyl group which are not adjacent to each other can be replaced with O or S; m is a number of the substituted groups which connect to the same aromatic ring and m is an integer of 1-3; if m is greater than 1, the polymerizable groups can be same or different; and n+m is less than a number of groups to which the aromatic ring at most connect.

In accordance with one preferred embodiment of the present disclosure, in the step of S50, an irradiation energy of the UV light is 85-100 MW/cm², and an irradiation duration of the UV light is 20-100 minutes.

The present disclosure provides a method for manufacturing a liquid crystal display (LCD) panel. By performing a special treatment for surfaces of the array substrate and the color filter substrate, two polymer films are strongly adsorbed on the array substrate and the color filter substrate respectively, and the two polymer films have different thickness. Therefore, alignment efficiency of liquid crystal molecules is increased, thus improving display quality of LCD panels.

BRIEF DESCRIPTION OF DRAWINGS

To explain in detail the technical schemes of the embodiments or existing techniques, drawings that are used to illustrate the embodiments or existing techniques are provided. The illustrated embodiments are just a part of those of the present disclosure. It is easy for any person having ordinary skill in the art to obtain other drawings without labor for inventiveness.

DETAILED DESCRIPTION

Figure 1:
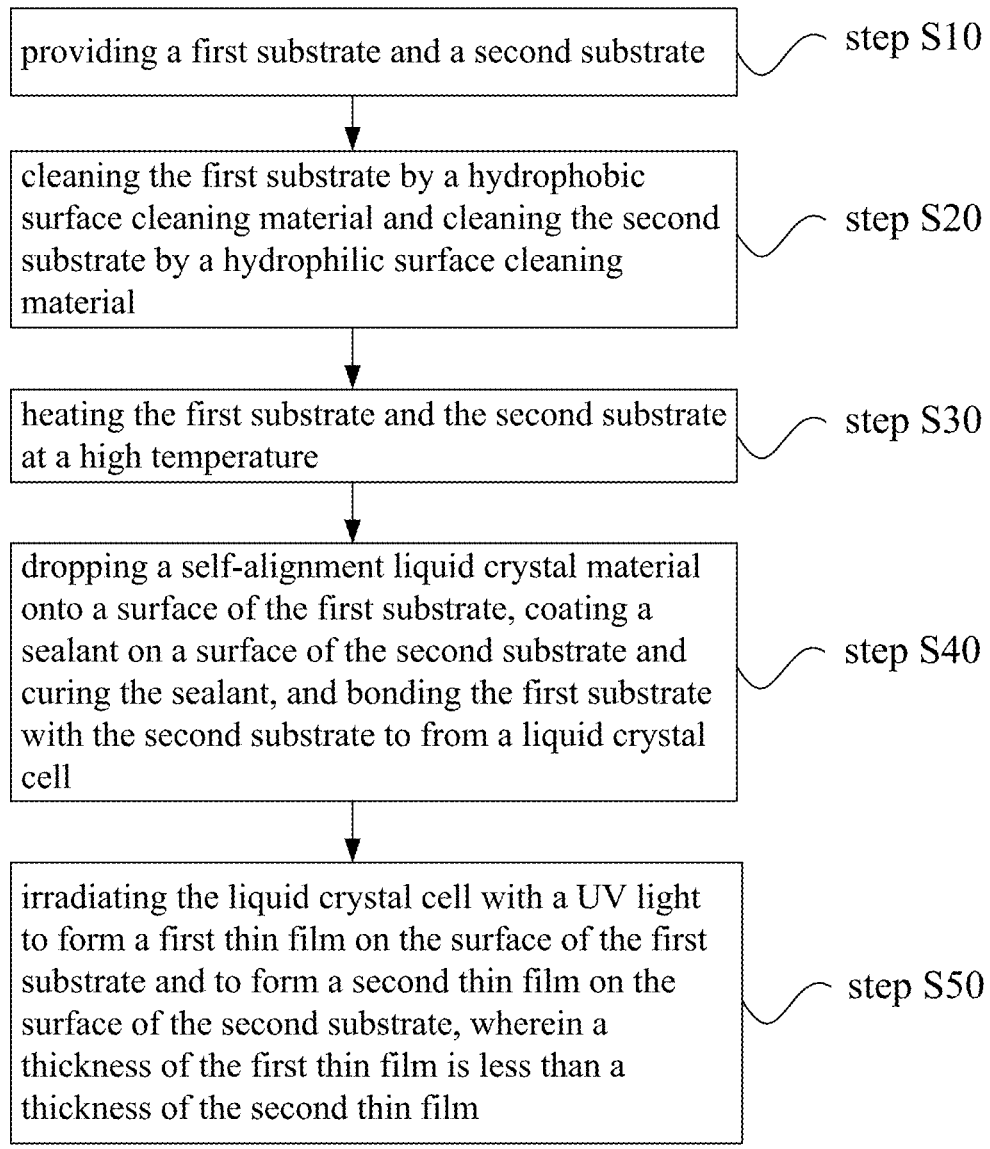
FIG. 1 shows a flowchart of a method for manufacturing an LCD panel according to one embodiment of the present disclosure.

The following embodiments refer to the accompanying drawings for exemplifying specific implementable embodiments of the present disclosure. Moreover, directional terms described by the present disclosure, such as upper, lower, front, back, left, right, inner, outer, side, etc., are only directions by referring to the accompanying drawings, and thus the used directional terms are used to describe and understand the present disclosure, but the present disclosure is not limited thereto. In the drawings, the same reference symbol represents the same or similar components.

The following detailed description is made with reference to drawings in conjunction with preferred embodiments.

FIG. 1 shows a flowchart of a method for manufacturing an LCD panel according to one embodiment of the present disclosure. FIGS. 2A-2D show each step in a process flow of a method for manufacturing an LCD panel according to one embodiment of the present disclosure.

As shown in FIG. 1 and FIGS. 2A-2D, the present disclosure provides a method for manufacturing a liquid crystal display (LCD) panel. The method includes the following steps.

In a step S10, a first substrate 10 and a second substrate 20 are provided.

In one embodiment, the first substrate 10 is an array substrate, and the second substrate 20 is a color filter substrate.

In another embodiment, the first substrate 10 is a color filter substrate, and the second substrate 20 is an array substrate.

Figure 2A:
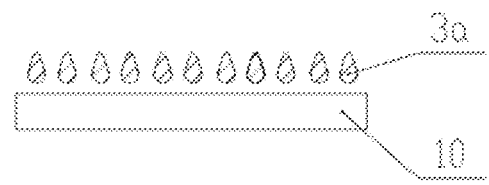
FIGS. 2A, 2B, 2C, and 2D show each step in a process flow of a method for manufacturing an LCD panel according to one embodiment of the present disclosure.
Figure 2A:
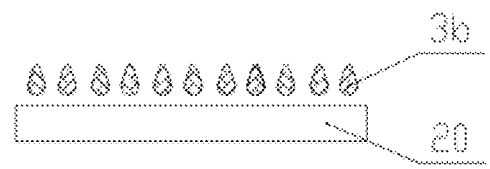

As shown in FIG. 2A, in a step S20, a hydrophobic surface cleaning material 3a is used to clean the first substrate 10, and a hydrophilic surface cleaning material 3b is used to clean the second substrate 20.

The hydrophobic surface cleaning material 3a is composed of a material with high surface energy and a solvent. The material with high surface energy can be fatty acid glyceride, sorbitan trioleate, or polysorbate. The solvent can be acetone, N-ethylpyrrolidine, or γ-hexalactone.

In one embodiment, the hydrophobic surface cleaning material 3a is prepared by dissolving 2-4 g of fatty acid glyceride in 996-998 g of acetone. Preferably, a mass ratio of fatty acid glyceride to acetone is 3:997.

The hydrophilic surface cleaning material 3b is composed of a hydrophilic compound and a solvent. The hydrophilic compound can be methanol, ethanol, ethylene glycol, glycerol, formic acid, acetic acid, or adipic acid. The solvent can be water or acetone.

In one embodiment, the hydrophilic surface cleaning material 3b is prepared by dissolving 2-4 g of glycerol in 996-998 g of water. Preferably, a mass ratio of glycerol to water is 3:997.

Figure 2B:
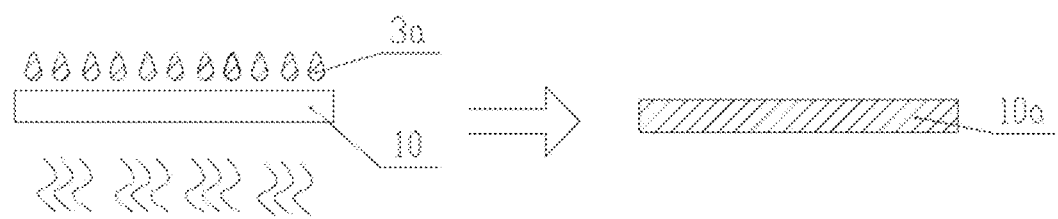
Figure 2B:
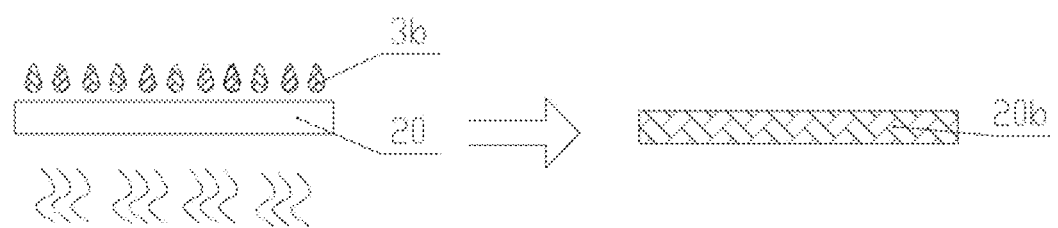

As shown in FIG. 2B, in a step S30, the first substrate 10 and the second substrate 20 are heated at a high temperature. The first substrate after being heated is represented by the reference numeral 10a, and the second substrate after being heated is represented by the reference numeral 20b.

The first substrate 10 and the second substrate 20 are heated at 100-150° C. to evaporate residual solvent, and the heating duration is as long as 1-10 minutes.

Figure 2C:
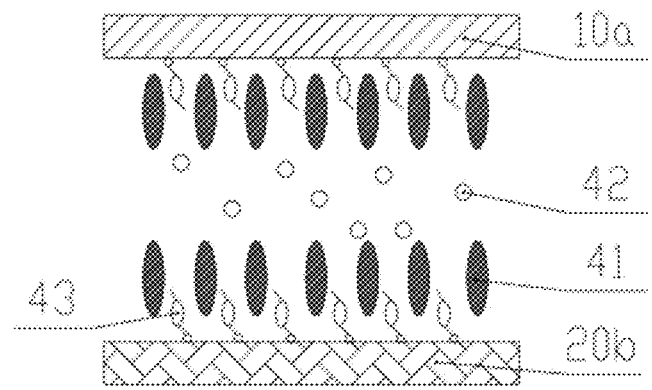

As shown in FIG. 2C, in a step S40, a self-alignment liquid crystal material 4 is dropped onto a surface of the first substrate 10a, a sealant is coated on a surface of the second substrate 20b and a curing operation is performed to cure the sealant, and then the first substrate 10a is bonded with the second substrate 20b to from a liquid crystal cell.

In one embodiment, the self-alignment liquid crystal material 4 includes a vertical alignment agent 43, a polymerizable monomer 42, and a negative liquid crystal material 41.

Specifically, an amount of the vertical alignment agent 43 is 0.1-5 wt % based on a total mass of the self-alignment liquid crystal material 4, an amount of the polymerizable monomer 42 is 0.1-1 wt % based on the total mass of the self-alignment liquid crystal material 4, and an amount of the negative liquid crystal material 41 is 94-99.8 wt % based on the total mass of the self-alignment liquid crystal material 4.

The vertical alignment agent has a formula of:

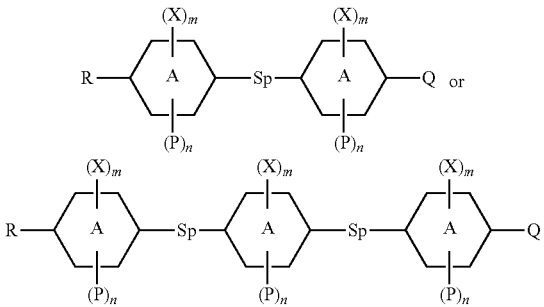

wherein Q is an amine group (such as a primary amine group, a secondary amine group, or a tertiary amine group), —OH, —COOH, or —SH;

A is a benzene group or a cycloalkyl group;

Sp is —(CH$_2$)n- and n is a number of 1-8, where CH$_2$ can be replaced with —O—, —S—, —CO—, —CO—O—, —O—CO—, —O—CO—O—, —OCH$_2$—, —CH$_2$O—, —CH=CH—, —CF=CF—, —CH=CH—COO—, —OCO—CH=CH—, or —C≡C—;

R is a straight or branched chain C$_3$-C$_{20}$ alkyl group, where CH$_2$ can be replaced with —O—, —CONH—, —COO—, —O—CO—, —CO—, or —CH=CH—, and H can be replaced with F or Cl;

P is a polymerizable group selected from at least one of a methyl methacrylate group, a methacrylate group, a vinyl group, a vinyloxy group, and an epoxy group; n is a number of the polymerizable groups which connect to a same aromatic ring and n is an integer of 1-3; and if n is greater than 1, the polymerizable groups can be same or different; and X is a substituted group selected from at least one of —F, —Cl, —Br, a methyl group, —CN, and a straight or branched chain $C_2$-$C_8$ alkyl group, where one or more methyl groups of the alkyl group which are not adjacent to each other can be replaced with O or S; m is a number of the substituted groups which connect to the same aromatic ring and m is an integer of 1-3; if m is greater than 1, the polymerizable groups can be same or different; and n+m is less than a number of groups to which the aromatic ring at most connect.

Figure 2D:
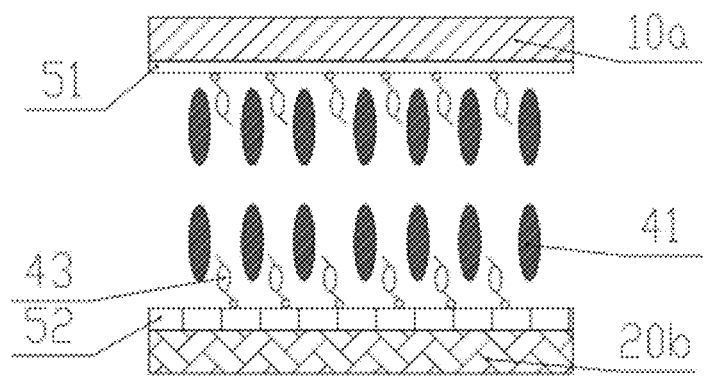

As shown in FIG. 2D, in a step S50, the liquid crystal cell is irradiated with UV light to form a first thin film 51 on the surface of the first substrate and to form a second thin film 52 on the surface of the second substrate, where a thickness of the first thin film 51 is less than a thickness of the second thin film 52.

Most of the polymerizable monomers 42 are adsorbed on the second substrate 20b, and only a few polymerizable monomers 42 are adsorbed on the first substrate 10a. This is because intramolecular hydrogen bonds are generated between the hydroxy groups of the polymerizable monomers 42 and the hydrophilic surface of the second substrate 20b. And, the polymerizable monomers 42 are more likely to be adsorbed on the second substrate 20b than on the first substrate 10a. Therefore, a thickness of the second thin film 52 formed on the second substrate 20b is greater than a thickness of the first thin film 51 formed on the first substrate 10a.

Specifically, in the step of S50, an irradiation energy of the UV light is 85-100 MW/cm$^2$, and an irradiation duration of the UV light is 20-100 minutes.

Figure 3A:
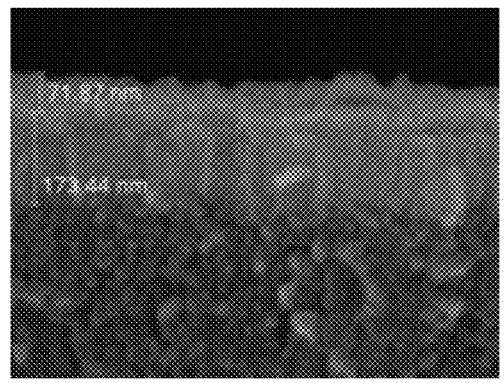
FIG. 3A shows an scanning electron microscope (SEM) image of a second substrate according to on embodiment of the present disclosure, which shows a thickness of a second thin film.
Figure 3B:
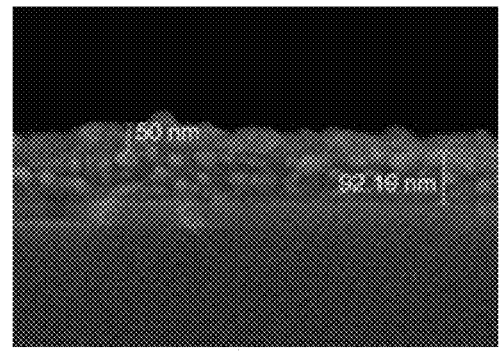
FIG. 3B shows an scanning electron microscope (SEM) image of a first substrate according to on embodiment of the present disclosure, which shows a thickness of a first thin film.

In one embodiment, an amount of the vertical alignment agent 43 is 1.0 wt % based on a total mass of the self-alignment liquid crystal material 4, an amount of the polymerizable monomer 42 is 0.3 wt % based on the total mass of the self-alignment liquid crystal material 4, and an amount of the negative liquid crystal material 41 is 99.2 wt % based on the total mass of the self-alignment liquid crystal material 4. Under such conditions, the first thin film and the second thin film are formed as shown in FIGS. 3A and 3B. As can be seen in FIG. 3A, a thickness of the second thin film 52 is 71.87 nanometer. As can be seen in FIG. 3B, a thickness of the first thin film 51 is 50 nanometer. The thickness of the second thin film 52 is greater than the thickness of the first thin film is 51.

The present disclosure provides a method for manufacturing a liquid crystal display (LCD) panel. By performing a special treatment for surfaces of the array substrate and the color filter substrate, two polymer films are strongly adsorbed on the array substrate and the color filter substrate respectively, and the two polymer films have different thickness. Therefore, alignment efficiency of liquid crystal molecules is increased, thus improving display quality of LCD panels.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:
1. A method for manufacturing a liquid crystal display (LCD) panel, comprising:
   a step S10 of providing a first substrate and a second substrate;
   a step S20 of cleaning the first substrate by a hydrophobic surface cleaning material and cleaning the second substrate by a hydrophilic surface cleaning material;
   a step S30 of heating the first substrate and the second substrate at a high temperature of 100-150° C. for 1-10 minutes;
   a step S40 of dropping a self-alignment liquid crystal material onto a surface of the first substrate, coating a sealant on a surface of the second substrate and curing the sealant, and bonding the first substrate with the second substrate to from a liquid crystal cell; and
   a step S50 of irradiating the liquid crystal cell with UV light to form a first thin film on the surface of the first substrate and to form a second thin film on the surface of the second substrate, wherein a thickness of the first thin film is less than a thickness of the second thin film.
2. The method for manufacturing the LCD panel according to claim 1, wherein the self-alignment liquid crystal material includes a vertical alignment agent, a polymerizable monomer, and a negative liquid crystal material.
3. The method for manufacturing the LCD panel according to claim 2, wherein an amount of the vertical alignment agent is 0.1-5 wt % based on a total mass of the self-alignment liquid crystal material, an amount of the polymerizable monomer is 0.1-1 wt % based on the total mass of the self-alignment liquid crystal material, and an amount of the negative liquid crystal material is 94-99.8 wt % based on the total mass of the self-alignment liquid crystal material.
4. The method for manufacturing the LCD panel according to claim 3, wherein the vertical alignment agent has a formula of:

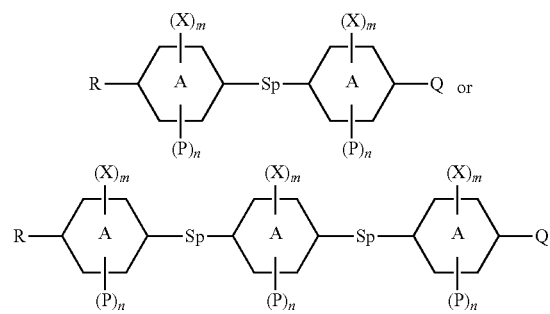

wherein Q is an amine group, —OH, —COOH, or —SH;
A is a benzene group or a cycloalkyl group;
Sp is —(CH$_2$)n- and n is a number of 1-8, wherein CH$_2$ can be replaced with —O—, —S—, —CO—, —CO—O—, —O—CO—, —O—CO—O—, —OCH$_2$—, —CH$_2$O—, —CH=CH—, —CF=CF—, —CH=CH—COO—, —OCO—CH=CH—, or —C≡C—;
R is a straight or branched chain $C_3$-$C_{20}$ alkyl group, wherein CH$_2$ can be replaced with —O—, —CONH—, —COO—, —O—CO—, —CO—, or —CH=CH—, and H can be replaced with F or Cl;
P is a polymerizable group selected from at least one of a methyl methacrylate group, a methacrylate group, a vinyl group, a vinyloxy group, and an epoxy group; n is a number of the polymerizable groups which connect to a same aromatic ring and n is an integer of 1-3; and if n is greater than 1, the polymerizable groups can be same or different; and X is a substituted group selected from at least one of —F, —Cl, —Br, a methyl group, —CN, and a straight or branched chain $C_2$-$C_8$ alkyl group, wherein one or more methyl groups of the alkyl group which are not adjacent to each other can be replaced with O or S; m is a number of the substituted groups which connect to the same aromatic ring and m is an integer of 1-3; if m is greater than 1, the polymerizable groups can be same or different; and n+m is less than a number of groups to which the aromatic ring at most connect.

5. The method for manufacturing the LCD panel according to claim 4, wherein in the step of S50, an irradiation energy of the UV light is 85-100 MW/cm$^2$, and an irradiation duration of the UV light is 20-100 minutes.

6. The method for manufacturing the LCD panel according to claim 1, wherein the first substrate is an array substrate, and the second substrate is a color filter substrate.

7. The method for manufacturing the LCD panel according to claim 1, wherein the first substrate is a color filter substrate, and the second substrate is an array substrate.

8. The method for manufacturing the LCD panel according to claim 1, wherein the hydrophobic surface cleaning material is a mixed solution including fatty acid glyceride and acetone, and a mass ratio of fatty acid glyceride to acetone is 3:997.

9. The method for manufacturing the LCD panel according to claim 1, wherein the hydrophilic surface cleaning material is a mixed solution including propanetrione and water, and a mass ratio of propanetrione to water is 3:997.

10. A method for manufacturing a liquid crystal display (LCD) panel, comprising:
    a step S10 of providing a first substrate and a second substrate;
    a step S20 of cleaning the first substrate by a hydrophobic surface cleaning material and cleaning the second substrate by a hydrophilic surface cleaning material;
    a step S30 of heating the first substrate and the second substrate at a high temperature;
    a step S40 of dropping a self-alignment liquid crystal material onto a surface of the first substrate, coating a sealant on a surface of the second substrate and curing the sealant, and bonding the first substrate with the second substrate to from a liquid crystal cell; and
    a step S50 of irradiating the liquid crystal cell with UV light to form a first thin film on the surface of the first substrate and to form a second thin film on the surface of the second substrate, wherein a thickness of the first thin film is less than a thickness of the second thin film.

11. The method for manufacturing the LCD panel according to claim 10, wherein the self-alignment liquid crystal material includes a vertical alignment agent, a polymerizable monomer, and a negative liquid crystal material.

12. The method for manufacturing the LCD panel according to claim 11, wherein an amount of the vertical alignment agent is 0.1-5 wt % based on a total mass of the self-alignment liquid crystal material, an amount of the polymerizable monomer is 0.1-1 wt % based on the total mass of the self-alignment liquid crystal material, and an amount of the negative liquid crystal material is 94-99.8 wt % based on the total mass of the self-alignment liquid crystal material.

13. The method for manufacturing the LCD panel according to claim 12, wherein the vertical alignment agent has a formula of:

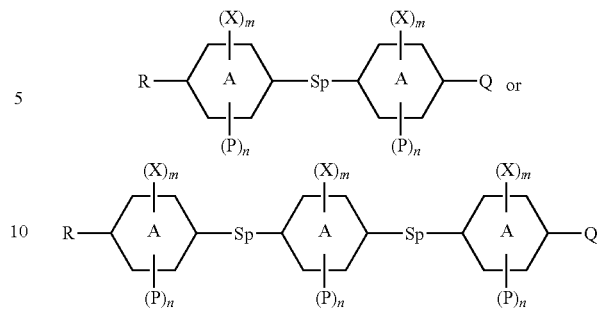

wherein Q is an amine group, —OH, —COOH, or —SH;
A is a benzene group or a cycloalkyl group;
Sp is —(CH$_2$)n- and n is a number of 1-8, wherein CH$_2$ can be replaced with —O—, —S—, —CO—, —CO—O—, —O—CO—, —O—CO—O—, —OCH2-, —CH2O—, —CH═CH—, —CF═CF—, —CH═CH—COO—, —OCO—CH═CH—, or —C≡C—;
R is a straight or branched chain $C_3$-$C_{20}$ alkyl group, wherein CH$_2$ can be replaced with —O—, —CONH—, —COO—, —O—CO—, —CO—, or —CH═CH—, and H can be replaced with F or Cl;
P is a polymerizable group selected from at least one of a methyl methacrylate group, a methacrylate group, a vinyl group, a vinyloxy group, and an epoxy group; n is a number of the polymerizable groups which connect to a same aromatic ring and n is an integer of 1-3; and if n is greater than 1, the polymerizable groups can be same or different; and
X is a substituted group selected from at least one of —F, —Cl, —Br, a methyl group, —CN, and a straight or branched chain $C_2$-$C_8$ alkyl group, wherein one or more methyl groups of the alkyl group which are not adjacent to each other can be replaced with O or S; m is a number of the substituted groups which connect to the same aromatic ring and m is an integer of 1-3; if m is greater than 1, the polymerizable groups can be same or different; and n+m is less than a number of groups to which the aromatic ring at most connect.

14. The method for manufacturing the LCD panel according to claim 13, wherein in the step of S50, an irradiation energy of the UV light is 85-100 MW/cm$^2$, and an irradiation duration of the UV light is 20-100 minutes.

15. The method for manufacturing the LCD panel according to claim 10, wherein the first substrate is an array substrate, and the second substrate is a color filter substrate.

16. The method for manufacturing the LCD panel according to claim 10, wherein the first substrate is a color filter substrate, and the second substrate is an array substrate.

17. The method for manufacturing the LCD panel according to claim 10, wherein the hydrophobic surface cleaning material is a mixed solution including fatty acid glyceride and acetone, and a mass ratio of fatty acid glyceride to acetone is 3:997.

18. The method for manufacturing the LCD panel according to claim 10, wherein the hydrophilic surface cleaning material is a mixed solution including propanetrione and water, and a mass ratio of propanetrione to water is 3:997.

* * * * *